No. 799,750. PATENTED SEPT. 19, 1905.
E. J. MUNDALE.
CORN HARVESTER.
APPLICATION FILED JUNE 20, 1904.
4 SHEETS—SHEET 2.
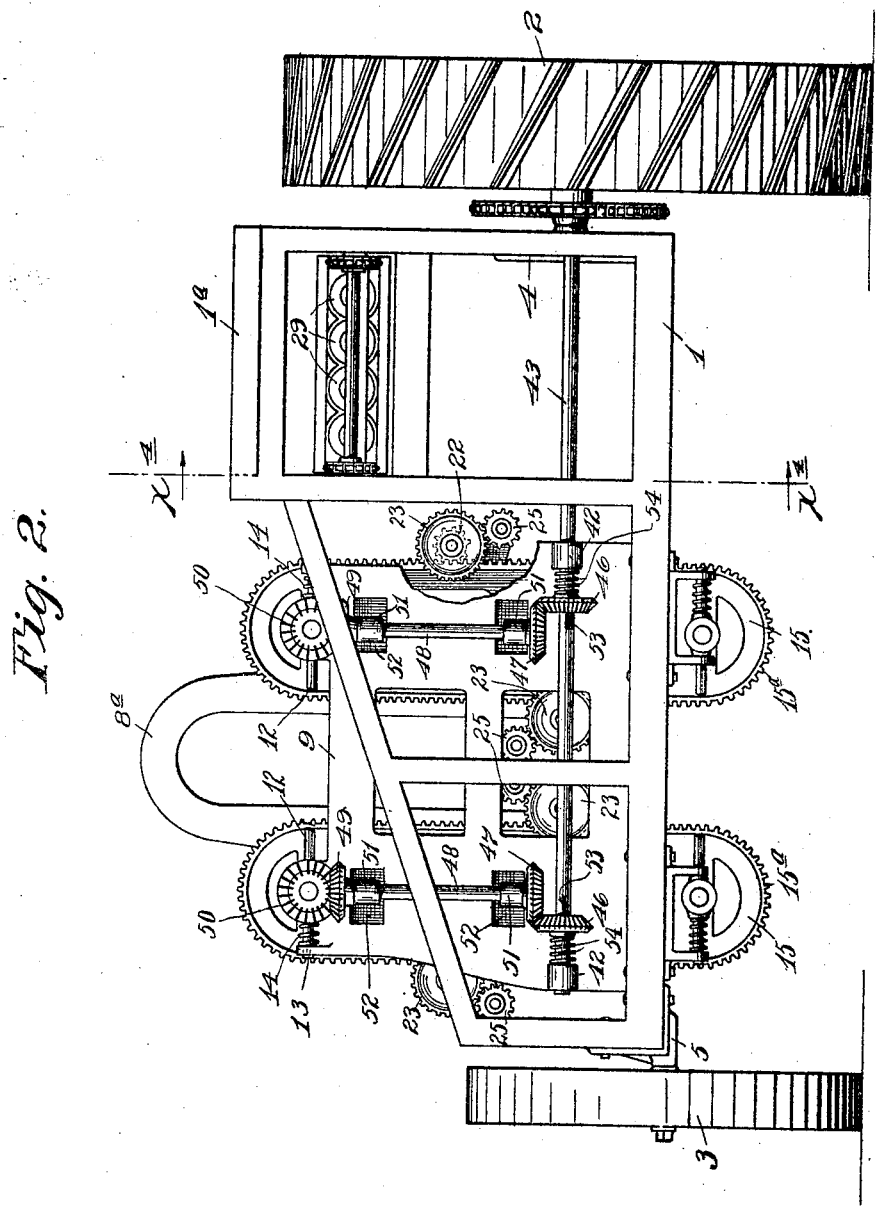
Witnesses.
E. W. Jeppesen,
A. H. Opsahl.
Inventor.
Edward J. Mundale.
By his Attorneys.
Williamson Merchant

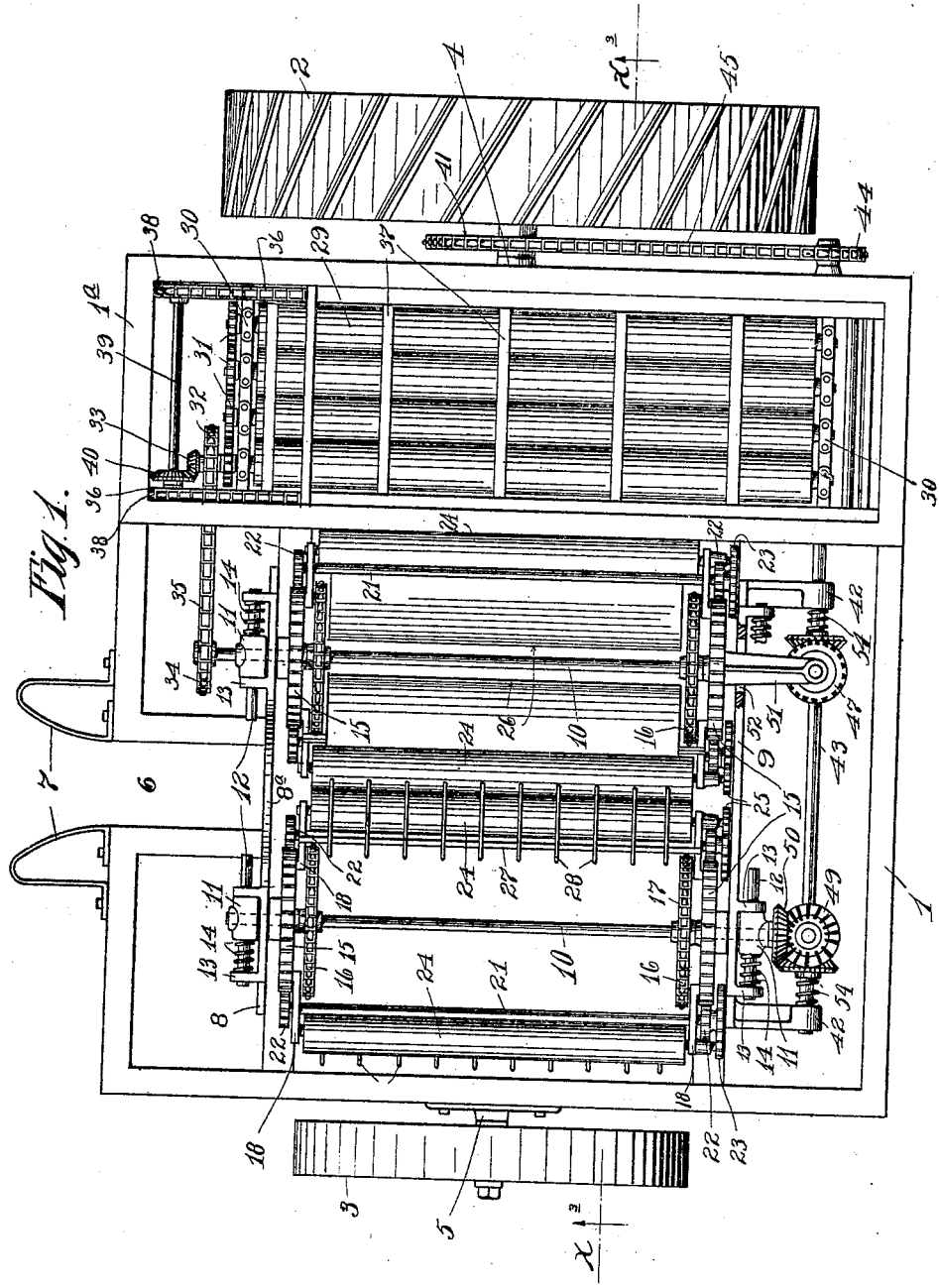

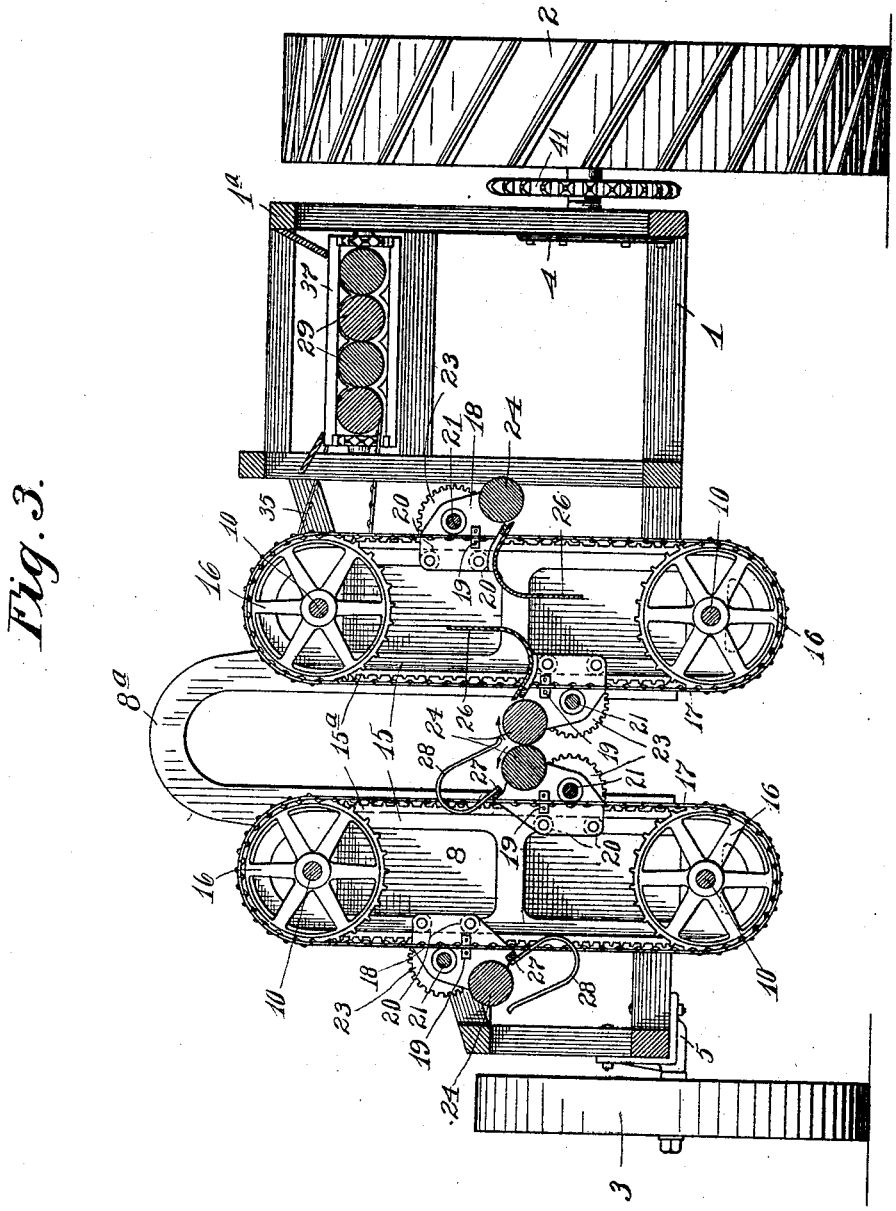

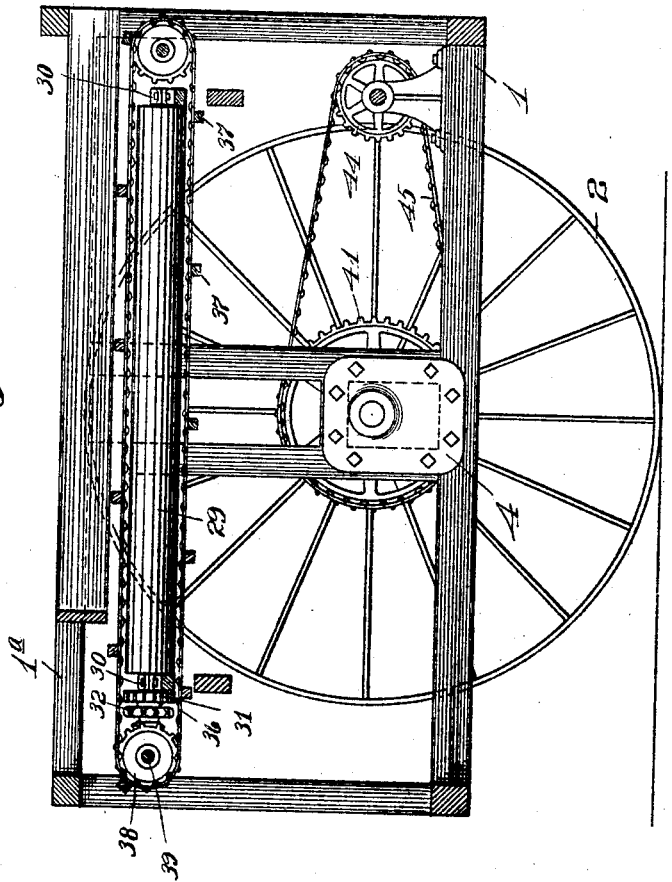

UNITED STATES PATENT OFFICE.

EDWARD J. MUNDALE, OF FROST, MINNESOTA.

CORN-HARVESTER.

No. 799,750.   Specification of Letters Patent.   Patented Sept. 19, 1905.

Application filed June 20, 1904. Serial No. 213,436.

*To all whom it may concern:*

Be it known that I, EDWARD J. MUNDALE, a citizen of the United States, residing at Frost, in the county of Faribault and State of Minnesota, have invented certain new and useful Improvements in Corn-Harvesters; and I do hereby declare the following to be a full, clear, and exact description of the invention, such as will enable others skilled in the art to which it appertains to make and use the same.

My invention relates to corn-harvesters, and has for its especial object to provide a machine which will travel along the rows of corn and operate on the standing stalks and without cutting them to snap off the ears of corn and to husk the ears.

To the above ends the invention consists of the novel devices and combinations of devices hereinafter described, and defined in the claims.

The invention is illustrated in the accompanying drawings, wherein like characters indicate like parts throughout the several views.

Figure 1 is a plan view showing the improved corn-harvester or traveling corn-husker, the draft appliances and certain other devices which form no part of my present invention being removed therefrom. Fig. 2 is a rear elevation of the machine shown in Fig. 1. Fig. 3 is a transverse vertical section taken approximately on the line $x^3\ x^3$ of Fig. 1, and Fig. 4 is a section taken from front to rear of the machine approximately on the line $x^4\ x^4$ of Fig. 2.

The numeral 1 indicates the framework of the machine, the same, as shown, being carried by a heavy traction-wheel 2 and by a lighter supporting-wheel 3, which wheels are loosely journaled on heavy trunnions projecting, respectively, from brackets 4 and 5, rigidly secured to the sides of said frame. At its intermediate portion the frame 1 is bifurcated to form a stock-collecting channel or crotch 6, that runs from the front nearly to the rear of said frame. The said frame, as shown, is formed with diverging gathering-arms 7, that constitute extensions of the channel 6 and afford a gathering-crotch. Rigidly secured to the frame 1 on opposite sides of the channel 6, near the forward portion of said frame, is a pair of vertically-disposed bearing-plates 8, that are rigidly tied together at their upper extremities by an upwardly-bowed yoke $8^a$. Rigidly secured to the said frame, near the rear thereof, is a vertically and transversely disposed bearing-plate 9.

Extending from front to rear of the machine, on each side of the gathering-crotch 6, is a pair of shafts 10, located one directly over the other, but a considerable distance apart. These shafts project through the bearing-plate 9 and through the bearing-bracket 8 without engagement therewith and are journaled in bearing-boxes 11, having plunger projections 12, that slide axially through and are supported by bearing-lugs 13 on the said bracket 8 and bearing-plate 9 and on the frame 1. Coiled springs 14, applied on the plungers 12, normally force the bearing-boxes 11 and shafts 10 into their extreme positions toward the collecting-channel 6, but permit the shafts and boxes to move away from the said channel when extreme pressure is applied thereto, the purpose of which will more clearly appear a little later on.

On each vertically-separated pair of shafts 10 is mounted a pair of vertically-elongated endless racks 15. (See particularly Figs. 1 and 3.) The members of these pairs of endless racks 15 are spaced apart laterally from front to rear of the machine, and their main body portions are arranged parallel and are vertically disposed. Said endless racks have laterally-projecting marginal flanges $15^a$ and have hub portions that directly bear upon the said shafts 10. Said racks are therefore carried by the shafts 10 and are adapted to move slightly toward and from each other under the yielding actions of the springs 14.

Just inward of the endless racks 15 the shafts 10 are provided with sprocket-wheels 16, arranged in pairs, and over which pairs of sprockets are run endless sprocket-chains 17. These sprocket-chains 17 follow approximately the lines of the endless racks 15. These chains 17 afford endless carriers, which carry coöperating snapping-rollers, which snapping-rollers are caused to rotate and to travel over the standing cornstalks. Each endless carrier made up of a pair of chains preferably carries several snapping-rollers, and the snapping-rollers of the two carriers are arranged to come together in pairs and to close onto the stalks in opposition to each other and to travel upward over the standing stalks while in alinement and while pressed together for action on the stalks. In the construction illustrated traveling bearing-heads 18 are attached to the chains 17 at 19, the said points 19 being located at opposite points of the chains and the said brackets having laterally-projecting rollers 20, that engage the inner edges of the rack-flanges 15ª to guide the said bearing-heads 18 around their endless courses, following the endless racks 15. The bearing-heads 18 are arranged in pairs located opposite to each other from front to rear of the machine, and extending from front to rear of the machine and mounted in each pair of bearing-heads 18 is a traveling counter-shaft 21, which outward of said bearing-heads carries spur-pinions 22, that travel and mesh with the corresponding endless racks 15. At their rear ends, as shown, said counter-shafts 21 are provided with spur-gears 23. Snapping-rollers 24 extend parallel to each other and to the counter-shafts 21 and are loosely journaled one in each pair of traveling bearing-heads 18. Said snapping-rollers at their rear ends carry spur-pinions 25, that mesh with the coöperating spur-gears 23 of the counter-shafts 21.

The pairs of traveling heads 18 at the right-hand side of the gathering-crotch and collecting-channel carry trough-like buckets 26, and the pair of traveling heads 18 at the left-hand side of said collecting-channel carry transverse tie-bars 27, having a plurality of deflecting-fingers 28 for purposes which will presently appear.

The husking-rollers 29, of which, as shown, there are four, are horizontally disposed, extend from front to rear of the machine just inside of the traction-wheel 2, and are suitably journaled in bearings 30 on a vertically-extended supplemental section 1ª of the main frame 1. The trunnions of these husking-rollers 29 project at their forward ends and are provided with intermeshing gears 31, one of the said trunnions also having a sprocket 32 and a beveled pinion 33. The upper right-hand shaft 10 carries a sprocket-wheel 34, over which and the sprocket 32, just noted, runs a sprocket-chain 35, serving to transmit motion from the said shaft 10 to the several husking-rollers. An endless slat-and-belt conveyer is mounted to run over the upper surfaces of the husking-rollers, such conveyer, as shown, being made up of a pair of endless sprocket-chains 36 and a plurality of connecting-slats 37. The sprocket-chains 36 run over sprockets 38, carried by a short counter-shaft 39, suitably journaled in the frame-section 1ª, the forward shaft 39 having a beveled gear 40, that meshes with the pinion 33, heretofore noted as being carried by one of the husking-rollers.

A large sprocket-wheel 41 is secured to the hub of the traction-wheel 2. Extending transversely of the machine at the rear thereof and suitably journaled in bearings 42 on the bearing-plate 9 and in bearings afforded by the frame-section 1ª is a long counter-shaft 43, having at its right-hand end a sprocket 44, over which and the sprocket 41 of the traction-wheel 2 runs an endless sprocket-chain 45. This counter-shaft 43 carries a pair of bevel-gears 46, that mesh with the bevel-gears 47 of vertically-disposed counter-shafts 48, which counter-shafts at their upper ends have bevel-gears 49, that mesh with bevel-gears 50 on the rear ends of the upper shafts 10. By these connections motion is imparted from the traction-wheel to the endless carriers afforded by the chains 17. The vertical shafts 48 (see particularly Figs. 1 and 2) are journaled in bearings 51, that project rearward from the frame portions of the rear endless racks 15 and work loosely through clearance-passages 52, formed in the rear bearing-plate 9. Also, as shown, the bevel-gears 46 are caused to rotate by the shaft 43, but are permitted to slide slightly thereon by means of keys 53. (See Fig. 2.) Said gears 46 are also shown as yieldingly pressed into mesh with the gears 47 by coiled springs 54.

Under the advance movement of the machine it is evident that the endless carriers will cause the snapping-rollers to travel endless courses and to come together in pairs at the bottom of the gathering-channel and then to move vertically upward. In this way the coöperating snapping-rollers are caused to approach each other near the ground, and thus to take hold of the standing stalks, and are then caused to run vertically upward over the same to snap off the ears. The snapping-rollers while they are being drawn over the standing stalks with a stripping action are caused to rotate in reverse directions (indicated by arrows marked on Fig. 3) and thereby to snap off the ears of the corn from the standing stalks. The ears thus snapped from the standing stalks will by the fingers 28 be guided into the trough-like bucket 26, which coöperates with the snapping-rollers then operative, and as the said rollers separate and make their return movements the ears caught by the pocket 26 will be thrown onto the husking-rollers 29, and these husking-rollers operate in the usual way; but the ears instead of being fed by gravity over the said husking-rollers are forced along positively by the endless conveyer 36 37. The said endless conveyer 36 37 forces the ears over the husking-rollers from the rear toward the front of the machine and discharges the same either upon the ground or into a suitable receptacle. (Not shown, but which might be carried by the machine.)

The springs 14, which act upon the sliding boxes 11, permit the snapping-rollers 24 when in action on the stalks to move slightly toward and from each other, so as to accommodate themselves to stalks of different thickness and to prevent breaking of the parts in case an ear of corn or other comparatively thick object should be forced between the said snapping-rollers.

The snapping-rollers, as is evident, operate in pairs, and the pairs of rollers operate in succession on the standing stalks of corn. In the arrangement illustrated there are two pairs of snapping-rollers; but this number, of course, may be varied at will.

The machine must of course be so driven that the row of standing cornstalks will be guided by the gathering-crotch 7 into the collecting-channel 6, by the latter of which the stalks are held within such bounds that they may be taken up and acted upon by the snapping-rollers under their approaching and subsequent upward movements already described.

From what has been said it will be understood that the machine described is capable of a large range of modification within the scope of my invention, as herein set forth and claimed.

What I claim, and desire to secure by Letters Patent of the United States, is as follows:

1. In a corn-harvester, a pair of coöperating snapping-rollers, and means for causing them to travel endless courses, first transversely of the machine's movement onto the row of standing stalks from opposite sides thereof, and then together upward over the stalks, to thereby snap off the ears, substantially as described.

2. In a corn-harvester, the combination with a frame adapted to straddle the row, and having a collecting-channel adapted to receive said row, of opposing snapping-rollers, and endless carriers on which said snapping-rollers are mounted traveling first transversely of the machine's movement for causing said snapping-rollers to enter said collecting-channel and to engage the standing stalks and then together upward over the stalks to snap off the ears therefrom, substantially as described.

3. In a corn-harvester, the combination with supports having vertically-elongated endless racks, of endless carriers traveling approximately the lines of said racks, and opposing snapping-rollers arranged to coöperate in pairs, mounted in bearings on said endless carriers, and geared to said endless racks, whereby the said snapping-rollers are caused to rotate and to travel under their movements over the standing cornstalks, substantially as described.

4. In a corn-harvester, the combination with yieldingly-mounted supports, of endless carriers mounted to travel over said supports, and means for causing said endless carriers to travel first transversely of the machine's movement, and then together upward opposing snapping-rollers carried by said endless carriers, and arranged to coöperate in pairs, for action on the standing cornstalks, and means for rotating said snapping-rollers while they are traveling over the stalks, substantially as described.

5. In a corn-harvester, the combination with opposing snapping-rollers, and a pair of endless carriers on which said snapping-rollers are mounted for causing the same to travel first transversely of the machine's movement and then together upward and to rotate, for action on the standing stalks, to snap off the ears therefrom, and husking-rollers receiving from said traveling snapping-rollers, substantially as described.

6. In a corn-harvester, the combination with a pair of endless carriers, traveling first transversely of the machine's movement and then together upward of opposing snapping-rollers mounted on said endless carriers, and arranged to operate in pairs on the standing cornstalks, means for causing said snapping-rollers to rotate, as they are moved over the stalks, husking-rollers, and a receptacle applied to one of the endless carriers, and arranged to deliver the ears of corn from said snapping-rollers to said husking-rollers, substantially as described.

7. In a corn-harvester, the combination with a gathering-crotch, of snapping-rollers arranged to work in opposing pairs, a pair of endless carriers on which said snapping-rollers are mounted traveling first transversely of the machine's movement and then together upward causing said snapping-rollers to travel vertically over the standing stalks, and means for rotating said snapping-rollers while they are traveling over the stalks, substantially as described.

8. In a corn-harvester, the combination with a frame which is divided to form a collecting-channel, of an arched bracket or yoke extending above said collecting-channel and tying together the forward portions of the machine-frame, of snapping-rollers arranged to work in pairs, a pair of endless carriers on which said snapping-rollers are mounted traveling first transversely of the machine's movement and then together upward for causing said snapping-rollers to travel vertically over the standing stalks, and means for rotating said snapping-rollers while they are traveling over the stalks, substantially as described.

In testimony whereof I affix my signature in presence of witnesses.

EDWARD J. MUNDALE.

Witnesses:
   EDW. B. MUNDALE,
   GEO. O. HALVORSON,
   E. E. ALDRICH.